Dec. 5, 1967  D. E. DIXON  3,356,368
HORSESHOE TARGET WITH FLOOR SIMULATING CLAY
Filed March 4, 1964

INVENTOR
DALE E. DIXON
BY
ATTORNEY

United States Patent Office 3,356,368
Patented Dec. 5, 1967

3,356,368
HORSESHOE TARGET WITH FLOOR
SIMULATING CLAY
Dale E. Dixon, 2616 49th St.,
Des Moines, Iowa 50310
Filed Mar. 4, 1964, Ser. No. 349,437
5 Claims. (Cl. 273—104)

This invention relates to a game apparatus and more particularly to a horeshoe pitching court.

It is the object of this invention to provide an improved horseshoe pitching court having a floor which replaces and has the characteristics of the clay in a conventional pitching court.

Another object of the invention is to provide a lightweight horseshoe pitching court which can be readily moved from place to place and does not injure the supporting surface of the court.

A further object of the invention is to provide in a portable horseshoe pitching court a yieldable floor which simulates the characteristics of the clay in a conventional court and is not affected by water so as to produce dust or mud when playing the game of horseshoes.

An additional object of the invention is to provide a compact and portable horseshoe pitching court which is economical and rugged in construction, and durable and reliable in use.

Further objects, features and advantages of this invention will appear from the following description and accompanying drawing, in which.

Figure 1:
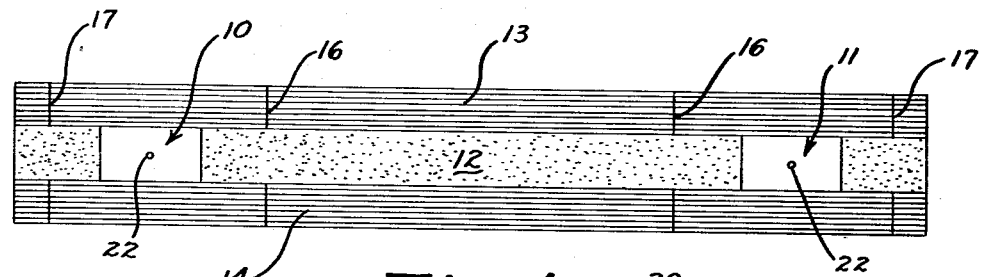
FIG. 1 is a plan view of a layout of a horseshoe pitching field having a pair of horseshoe courts of this invention spaced apart at pitching distance.

Referring to the drawing, there is shown in FIG. 1 a layout diagram of a horseshoe pitching field having a pair of pitching courts 10 and 11 spaced apart a pitching distance which is conventionally thirty-five feet. Positioned on the ground 12 adjacent opposite sides of the courts 10 and 11 are walks 13 and 14 which function as platforms during the throwing of the horseshoes. The walks 13 and 14 extend across the horseshoe pitching field and are used as paths when the players alternate the use of the pitching courts 10 and 11.

The walks 13 and 14 may be provided with marks or indicia 16 to indicate a short ladies' field which is thirty feet from the foul line to the stake and indicia 17 of a men's field which is forty feet from the stake. The walks 13 and 14 may be formed from a plurality of side-by-side pieces of lumber as indicated in FIG. 2 or from a permanent concrete or brick structure.

Figure 2:
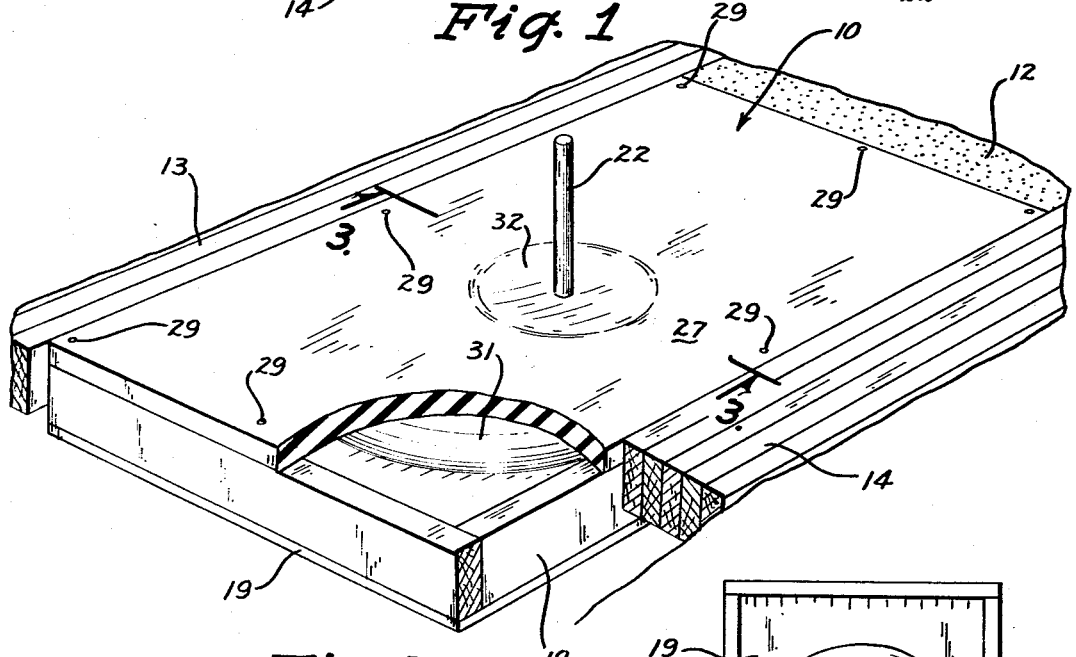
FIG. 2 is an enlarged perspective view of one of the horseshoe courts of FIG. 1 with a portion of the floor broken away.
Figure 4:
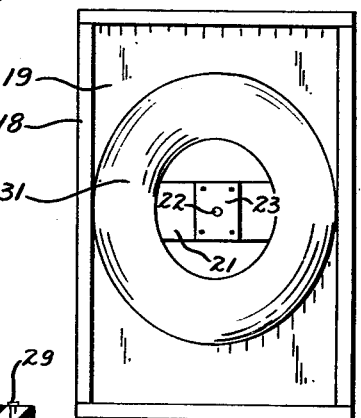
FIG. 4 is a reduced floor plan view of the horseshoe court of FIG. 2 with the floor removed.

Referring to FIG. 2, there is shown the court 10 interposed between the walks 13 and 14. Since the courts 10 and 11 are substantially identical in construction the following detailed description is limited to court 10. The court 10 has a rectangular-shape peripheral frame 18 attached to a flat bottom wall 19. In one embodiment the frame 18 is made from 2 x 4 lumber and has a length of four feet and a width of two and one-half feet.

Figure 3:
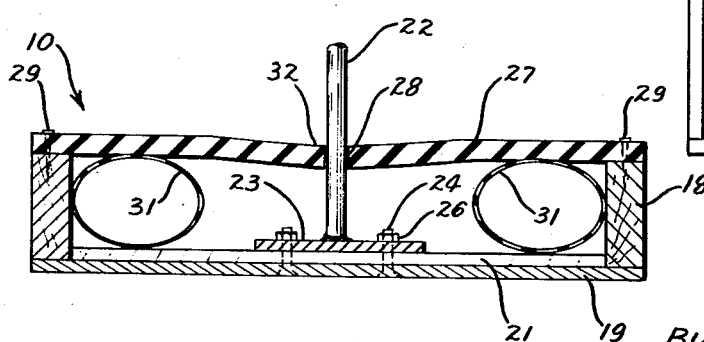
FIG. 3 is an enlarged sectional view taken along the line 3—3 of FIG. 2.

Positioned transversely across the center of the bottom wall 19 is a cross member 21 for supporting an upright stake 22 (FIG. 3). The lower end of the stake 22 is secured to a flat plate 23. Bolts 24 extend through the bottom wall, cross member 21, and the plate 23. Nuts 26 threadably received on the top sections of the bolts 24 coact with the bolts to clamp the plate 23 to the cross member 21.

The peripheral frame 18 and the bottom wall 19 form a box-like structure having an open top. A cover 27 of pliable material is positioned over the top of the box-like structure. The cover 27 is of a rectangular shape which corresponds to the rectangular shape of the peripheral frame 18. The stake 22 passes through a hole 28 in the center of the cover 27. The peripheral section of the cover 27 is attached to the top of the peripheral frame 18 by nails 29. The cover 27 is formed from material which has a low degree of yielding and resiliency so as to minimize the bouncing and rolling of the horseshoes aimed at the stake 22. These characteristics are substantially identical to the characteristics of clay in a conventional horseshoe court. The cover 27 constitutes a floor surrounding the stake 22 and is formed from layers of self-adhesive rubber material having a thickness of approximately one inch. Commercially this material is known as a sheet of reclaimed rubber, and is without the usual resilience attributed to rubber.

In order to prevent the cover 27 from sagging downwardly and to impart a return action of the cover to a horizontal position after it has been hit by a horseshoe, an annular hollow tube 31 of rubber or plastic material is positioned in the boxlike structure concentrically about the stake 22. The tube 31 contains air at low pressure and engages side walls of the frame 18 and annular portions of the bottom wall 19 and the cover 27 as shown in FIG. 3.

In use the unsupported circular portion of the cover 27 about the stake 22 tends to become depressed downwardly to form a pocket 32 which aids the placement of a thrown horseshoe relative to the stake 22. The cover 27 does not have sufficient elastic characteristics to return the center section to a substantially horizontal flat position. As previously mentioned the return action is the function of the tube 31.

When used for an out-of-doors installation as shown in FIG. 1, the pitching courts 10 and 11 are positioned in the ground 12 with the cover or floor 27 substantially level with the surface of the ground or the walks 13 and 14. Alternatively the pitching courts, being unitary structures, can be moved from place to place to set up a horseshoe pitching field in any desired location such as a residential lawn. The relatively flat and lightweight courts 10 and 11 are readily transportable and stored.

In the game of horseshoes, the U-shaped shoes are launched by a player toward a distant stake 22. The majority of the shoes will land on the floor 27 and slide or roll a short distance. The floor 27 being of a low yieldable material substantially prevents any bouncing of the shoes and inhibits the sliding and rolling of the shoes thereby limiting any appreciable movement of the shoes after they strike the cover 27. The low yieldability and resiliency of the cover 27 substantially simulates the characteristics of clay in a conventional court. Since the rubberlike material of the cover 27 is not affected by water it does not produce the objectionable dust or mud associated with a clay court.

In summary the horseshoe court of this invention is a readily movable unitary apparatus having a floor 27 of low yieldable and resilient characteristics for simulating the characteristics of clay in the conventional horseshoe court. The floor 27 is secured to a box-like structure and is resiliently supported by a hollow tube interposed between the bottom wall of the box-like structure and the floor 27. The annular tube 31 biases the floor 27 in an upward direction maintaining it in a substantially horizontal position. The circular section of the floor 27 about the stake 22 is not directly supported by the annular tube 31 and assumes a concave curvature forming a pocket 32 about the stake 22.

The pitching courts of this invention have been described as usable in the game of horseshoes. The courts of this invention are not intended to be limited to the game of horseshoes since they are usable in a game played with quoits.

While there have been shown, described, and pointed out the fundamental novel features of the invention it is to be understood that various omissions, substitutions, changes in form and details of the pitching courts illustrated may be made by those skilled in the art, without departing from the scope of the invention which is to be limited only as indicated by the appended claims.

I claim:
1. A horseshoe game apparatus comprising:
  (a) a box-like structure of a rectangular-shape having upright side walls and a bottom member,
  (b) a sheet of reclaimed rubber positioned over the top of the box-like structure and secured to the top of the side walls thereof,
  (c) an upright stake secured to the bottom member and projected through the sheet of rubber, and
  (d) resilient means positioned in the box-like structure in engagement with the sheet of rubber and the upper surface of said bottom member, the underside of said resilient means acting to continuously yieldably bias the sheet of rubber in an upward direction.
2. A horseshoe game apparatus comprising:
  (a) a box-like structure having upright side walls and a bottom member,
  (b) a floor means formed of a material having the yieldability and resilience characteristics of reclaimed rubber positioned over the top of the box-like structure and secured to the side walls thereof,
  (c) an upright stake secured to the bottom member and projected through said floor, and
  (d) biasing means positioned between said bottom member and the floor and engageable with portions of the underside of said floor and the upper surface of said bottom member to resiliently support the floor between the side walls of the structure.
3. A horseshoe game apparatus comprising:
  (a) a floor formed of a reclaimed rubber material,
  (b) frame means for supporting peripheral portions of the floor,
  (c) said floor having an opening therein to receive an upright stake,
  (d) biasing means engageable with the underside of said floor and a supporting surface for resiliently supporting portions of the floor between peripheral portions thereof.
4. The horseshoe game apparatus defined in claim 3 wherein the biasing means comprises:
  (a) an annular hollow resilient tube positioned within said frame means in engagement with the underside of said floor.
5. The horseshoe pitching game apparatus as defined in claim 3, wherein said biasing means engages with the underside of said floor only in the outermost regions thereof, whereby the center portion of said floor is left unsupported from below, resulting in a slight sagging thereof.

References Cited

UNITED STATES PATENTS

| 1,098,872 | 6/1914 | Akerberg | 273—100 |
| 2,216,818 | 10/1940 | Kuhlman | 297—461 X |
| 3,326,556 | 6/1967 | Andersen | 273—100 X |

ANTON O. OECHSLE, *Primary Examiner.*

DELBERT B. LOWE, *Examiner.*

M. R. PAGE, *Assistant Examiner.*